(12) United States Patent
Hubert

(10) Patent No.: US 7,464,130 B2
(45) Date of Patent: Dec. 9, 2008

(54) LOGIC CIRCUIT AND METHOD FOR PERFORMING AES MIXCOLUMN TRANSFORM

(75) Inventor: Gerardus T. M. Hubert, Geldrop (NL)

(73) Assignee: NXP B.V., Eindhoven (NL)

( * ) Notice: Subject to any disclaimer, the term of this patent is extended or adjusted under 35 U.S.C. 154(b) by 796 days.

(21) Appl. No.: 10/516,846

(22) PCT Filed: Jun. 4, 2003

(86) PCT No.: PCT/IB03/02583

§ 371 (c)(1),
(2), (4) Date: Dec. 3, 2004

(87) PCT Pub. No.: WO03/104973

PCT Pub. Date: Dec. 18, 2003

(65) Prior Publication Data

US 2005/0182812 A1    Aug. 18, 2005

(30) Foreign Application Priority Data

Jun. 7, 2002    (GB)    ................................. 0213242.1

(51) Int. Cl.
*G06F 7/52* (2006.01)
(52) U.S. Cl. ...................................................... 708/607
(58) Field of Classification Search .................. 708/607
See application file for complete search history.

(56) References Cited

U.S. PATENT DOCUMENTS 5,933,361 A * 8/1999 Ohki ........................... 708/607
6,718,465 B1 * 4/2004 Lin ............................. 713/100
2004/0010533 A1 * 1/2004 Castrapel et al. ............ 708/607

OTHER PUBLICATIONS

McLoone Met al, "High performance slngle-chlp FPGA RIJnadael algorithm implementations" Cryptographic Hardware and Embedded Systems. 3rd International Workshop, CHES 2001, Paris, Francce, May 14-16, 2001 Proceedings, Lecture Notes in Computer Science, Berlin: Springer, DE, vol. 2162, May 14, 2001, pp. 65-76.*

Stallings, "The Advanced Encryption Standard", Cryptologia, United States Military Academy, West Point, NY, US, vol. 26, No. 3, Jul. 2001, pp. 165-188.*

* cited by examiner

*Primary Examiner*—Tan V Mai

(57) ABSTRACT

A logic circuit having structure for performing the AES Rijndael MixColumns transform exploits the relationship between each successive row of the transform matrix and its preceding row. Multiplication of an (m.times.n) matrix by a (1.times.n) or by a (m.times.1) matrix is performed, where m is a number of rows and n is a number of columns, and where each successive row, m, of n elements is a predetermined row permutation of a preceding row, includes: n multiplication circuits; n logic circuits; n registers for receiving logical output from the logic circuits; feedback logic for routing contents of each register to a selected one of inputs of the logic circuits in accordance with a feedback plan that corresponds to the relationship between successive matrix rows; and a control unit for successively providing as input to each of the n multiplication circuits each element in the (1.times.n) or (m.times.1) matrix.

17 Claims, 2 Drawing Sheets

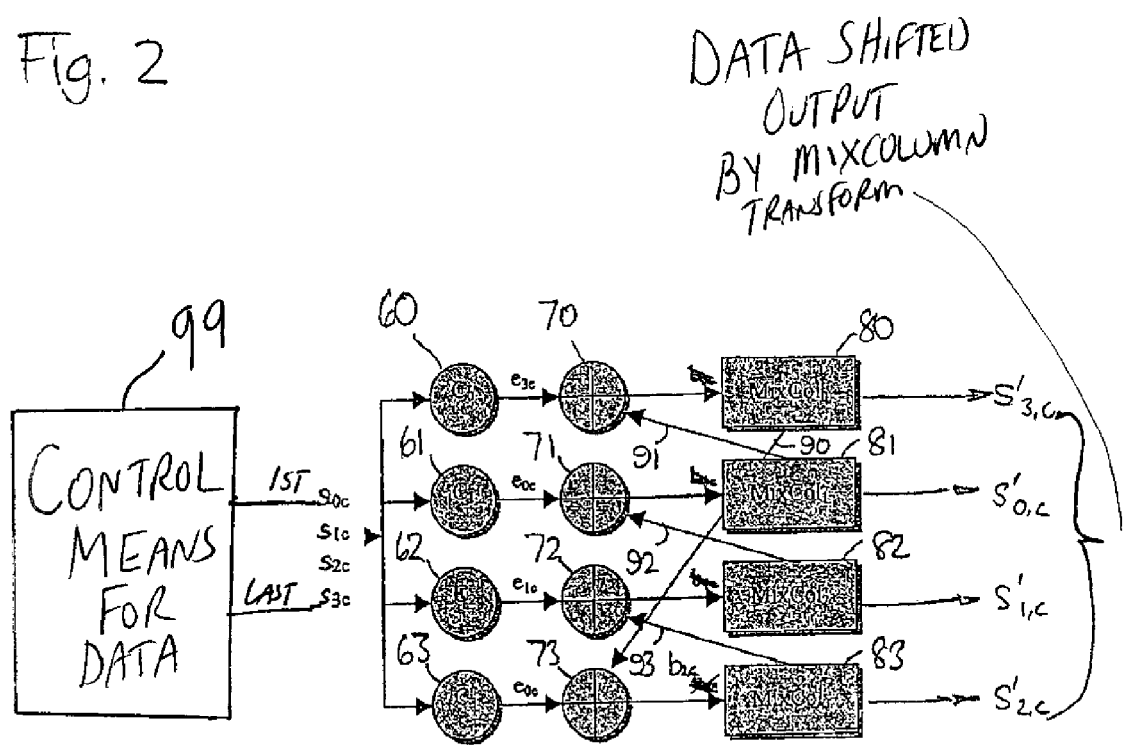

LOGIC CIRCUIT AND METHOD FOR PERFORMING AES MIXCOLUMN TRANSFORM

Figure 1:
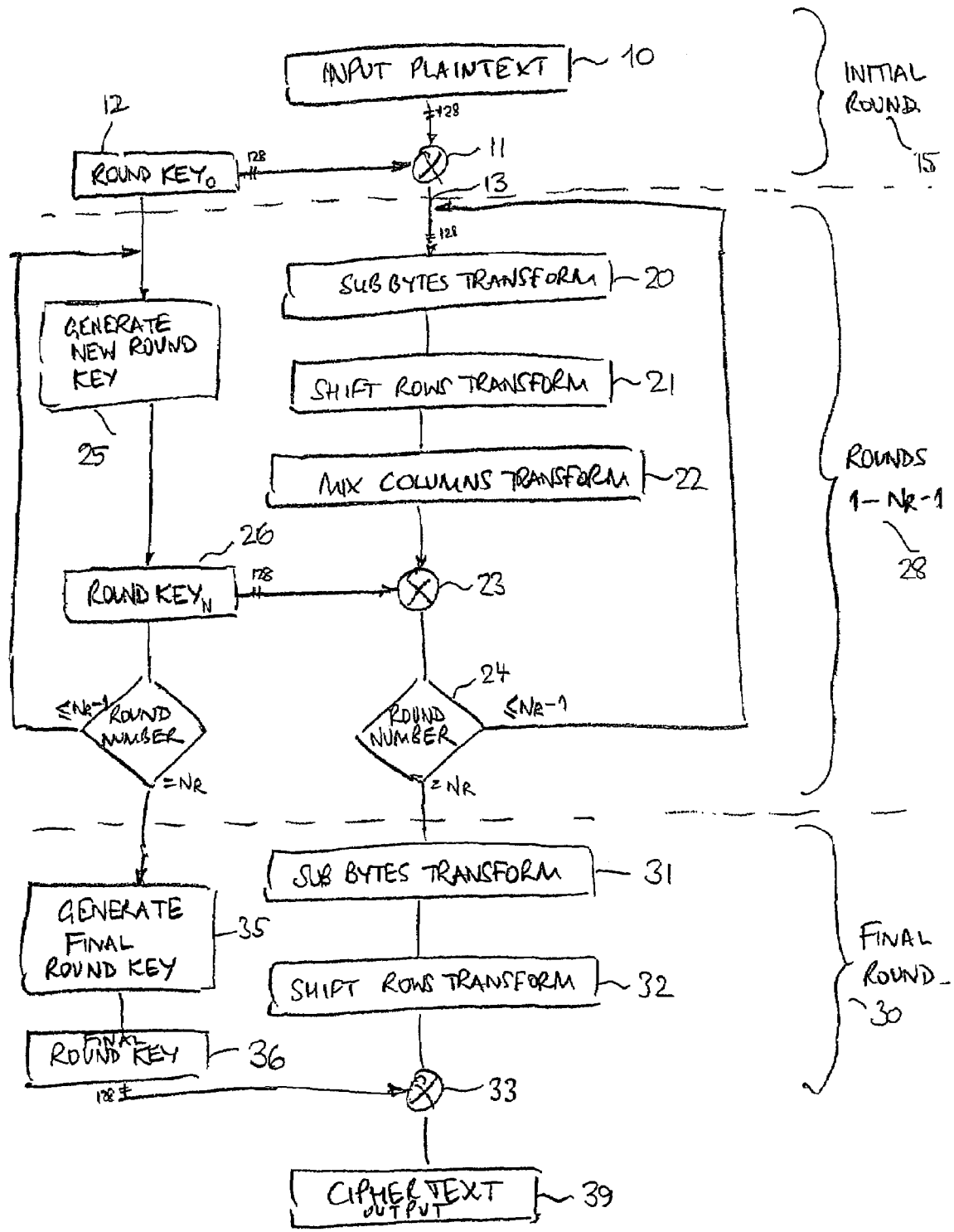

The present invention relates to methods and apparatus for implementation of the Advanced Encryption Standard (AES) algorithm and in particular to methods and apparatus for performing the matrix multiplication operation that constitutes the AES MixColumn transformation in each of the encryption and decryption rounds of the algorithm.

The invention has particular, though not exclusive, application in cryptographic devices such as those installed in smart cards and other devices where processor and memory resources are somewhat limited and many operations of the cryptographic algorithm are performed in dedicated ASIC or FPGA hardware.

The AES algorithm has wide application in the encryption of data to be transmitted in a secure fashion. One application is in the transmittal of personal and/or financial information from a smartcard to a card reader device. Confidential data stored on the card must not be retrieved from the card except in encrypted form to ensure that the data so retrieved cannot be intercepted and read by an unauthorised third party. Only the authorised reader is able to decrypt the data retrieved from the card.

Similarly, data supplied by the card reader to be stored in the card must be passed to the card in encrypted form, and decrypted by the card for storage and subsequent retrieval.

While the AES algorithm is relatively straightforward to implement in a conventional computer system deploying state of the art processor and memory circuits, in a smartcard application, the processor and memory resource is very limited, and many functions must be executed in dedicated hardware, such as ASICs or FPGAs.

There is therefore a requirement for hardware implementations of the procedures required in the AES algorithm which implementations require the minimum use of hardware resource.

It is an object of the present invention to provide suitable circuitry for effecting the MixColumn transform deployed in the standard AES (Rijndael) cryptographic algorithm, both for encryption and decryption.

According to one aspect, the present invention provides a logic circuit for multiplication of an (m×n) matrix by a (1×n) or by a (m×1) matrix, where m is a number of rows and n is a number of columns, and wherein each successive row m, of n elements is a predetermined row permutation of a preceding row, the circuit comprising:

n multiplication circuits each having an input and an output which returns the value of said input multiplied by a predetermined multiplicand;

n logic circuits, each for executing a predetermined logical combination of a first input and a second input to provide a logical output, the first input being coupled to the output of a corresponding one of the n multiplication circuits;

n registers for receiving said logical output;

feedback logic for routing the contents of each register to a selected one of the second inputs in accordance with a feedback plan that corresponds to the predetermined row permutation; and control means for successively providing as input to each of the n multiplication circuits each element in the (1×n) or (m×1) matrix.

Embodiments of the present invention will now be described by way of example and with reference to the accompanying drawings in which:

FIG. 1 is a flow diagram illustrating implementation of an encryption operation using the AES block cipher algorithm; and FIG. 2 is a schematic diagram of a functional logic block for performing the MixColumns transform.

The AES algorithm for encryption of plaintext to ciphertext is shown in FIG. 1. The AES algorithm may be implemented using a 128-bit, a 192-bit or a 256-bit key operating on successive 128-bit blocks of input data. The present invention is applicable to all of these implementations. FIG. 1 will now be described in the context of the basic implementation using a 128-bit key.

An initial 128-bit block of input plaintext 10 is XOR-combined 11 with an original 128-bit key 12 in an initial round 15. The output 13 from this initial round 15 is then passed through a number of repeated transform stages, in an encryption round 28 which includes the SubBytes transform 20, the ShiftRows transform 21 and the MixColumns transform 22 in accordance with the defined AES algorithm.

The output from the MixColumns transform 22 is XOR-combined 23 with a new 128-bit round key 26, which has been derived 25 from the initial (original) key 12. The output from this XOR-combination 23 is fed back to pass through the encryption round 28 a further number of times, the number depending upon the particular implementation of the algorithm.

For each successive iteration through the encryption round 28, a new round key 26' is derived from the existing round key 26 according to the AES round key schedule.

The number of iterations (Nr-1) of the encryption round 28 is nine where a 128-bit encryption key is being used, eleven where a 192-bit encryption key is being used, and thirteen where a 256-bit encryption key is being used.

After the requisite number (Nr-1) of encryption rounds 28, a final round, Nr, is entered under the control of decision box 24. The final round 30 comprises a further SubBytes transform 31, a further ShiftRows transform 32, and a subsequent XOR-combination 33 of the result with a final round key 36 generated 35 from the previous round key. The output therefrom comprises the ciphertext output 39 of the encryption algorithm.

The present invention relates particularly to the performing of the MixColumns transform 22. Through the rounds 28, 30, the 128-bit blocks being processed are conveniently represented as 16 8-bit blocks in a 4×4 matrix, as $s_{row,\ column}$, according to the pattern,

| $S_{0,0}$ | $S_{0,1}$ | $S_{0,2}$ | $S_{0,3}$ |
|---|---|---|---|
| $S_{1,0}$ | $S_{1,1}$ | $S_{1,2}$ | $S_{1,3}$ |
| $S_{2,0}$ | $S_{2,1}$ | $S_{2,2}$ | $S_{2,3}$ |
| $S_{3,0}$ | $S_{3,1}$ | $S_{3,2}$ | $S_{3,3}$ |

In the MixColumns transform 22, the columns of this state are considered as polynomials over $GF(2^8)$ and multiplied modulo $(X^4+1)$ with a predetermined fixed polynomial a(x), given by:

$$a(x)=a_3x^3+a_2x^2+a_1x+a_0,$$

in which, represented as hexadecimal values, $a_3$=03 h $a_2$=01 h $a_1$=01 h $a_0$=02 h.

The polynomial is co-prime to $x^4+1$ and is therefore invertible.

For encryption, the MixColumns transform can therefore be expressed as $s_{r,c} \rightarrow s'_{r,c}$, for each of the columns in s.

$$\begin{pmatrix} s'_{0,c} \\ s'_{1,c} \\ s'_{2,c} \\ s'_{3,c} \end{pmatrix} = \begin{pmatrix} a_0 & a_3 & a_2 & a_1 \\ a_1 & a_0 & a_3 & a_2 \\ a_2 & a_1 & a_0 & a_3 \\ a_3 & a_2 & a_1 & a_0 \end{pmatrix} \begin{pmatrix} s_{0,c} \\ s_{1,c} \\ s_{2,c} \\ s_{3,c} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} \begin{pmatrix} s_{0,c} \\ s_{1,c} \\ s_{2,c} \\ s_{3,c} \end{pmatrix}$$

The evaluation of this matrix multiplication is:

$s'_{0,c} = \{02\}*s_{0,c} \oplus \{03\}*s_{1,c} \oplus s_{2,c} \oplus s_{3,c}$ $s'_{1,c} = s_{0,c} \oplus \{02\}*s_{1,c} \oplus \{03\}*s_{2,c} \oplus s_{3,c}$ $s'_{2,c} = s_{0,c} \oplus s_{1,c} \oplus \{02\}*s_{2,c} \oplus \{03\}s_{3,c}$ $s'_{3,c} = \{03\}*s_{0,c} \oplus s_{1,c} \oplus s_{2,c} \oplus \{02\}*s_{3,c}$ During decryption, the inverse of this operation is required. It is given by the following matrix multiplication.

$$\begin{pmatrix} s'_{0,c} \\ s'_{1,c} \\ s'_{2,c} \\ s'_{3,c} \end{pmatrix} = \begin{pmatrix} b_0 & b_3 & b_2 & b_1 \\ b_1 & b_0 & b_3 & b_2 \\ b_2 & b_1 & b_0 & b_3 \\ b_3 & b_2 & b_1 & b_0 \end{pmatrix} \begin{pmatrix} s_{0,c} \\ s_{1,c} \\ s_{2,c} \\ s_{3,c} \end{pmatrix} = \begin{pmatrix} 0E & 0B & 0B & 09 \\ 09 & 0E & 0E & 0D \\ 0D & 09 & 0E & 0B \\ 0B & 0D & 09 & 0E \end{pmatrix} \begin{pmatrix} s_{0,c} \\ s_{1,c} \\ s_{2,c} \\ s_{3,c} \end{pmatrix}$$

The evaluation of this matrix multiplication is:

$s'_{0,c} = \{0E\}*s_{0,c} \oplus \{0B\}*s_{1,c} \oplus \{0D\}*s_{2,c} \oplus \{09\}*s_{3,c}$ $s'_{1,c} = \{09\}*s_{0,c} \oplus \{0E\}*s_{1,c} \oplus \{0B\}*s_{2,c} \oplus \{0D\}*s_{3,c}$ $s'_{2,c} = \{0D\}*s_{0,c} \oplus \{09\}*s_{1,c} \oplus \{0E\}*s_{2,c} \oplus \{0B\}*s_{3,c}$ $s'_{3,c} = \{0B\}*s_{0,c} \oplus \{0D\}*s_{1,c} \oplus \{09\}*s_{2,c} \oplus \{0E\}*s_{3,c}$ It is noted that the MixColumns transform matrix has the special property that each successive row is a shifted or rotated version of the preceding row. In general, each element in a row appears in every row but in a different position in the row, and specifically, for the MixColumns transform matrix the different position of each element for each row constitutes a single position right shift or rotation.

According to the present invention, it has been recognised that this property allows the multiplication of each column of the state s to be achieved with significantly reduced hardware.

FIG. 2 illustrates an exemplary embodiment of hardware logic 50 adapted for the multiplication of an m×n matrix by a 1×n matrix, in which the relationship between each successive row of n elements of the m×n matrix is a predetermined row shift. For the AES MixColumns transform, m=4, n=4 and the predetermined relationship is a single right shift.

The logic 50 comprises four 8-bit multiplication circuits 60 . . . 63, four 8-bit XOR gates 70 . . . 73 and four feedback/output registers 80 . . . 83, shown as $MixCol_0$ . . . $MixCol_3$. Each multiplication circuit 70 . . . 73 is adapted for multiplication of an input by one of the matrix coefficients $c_0$, $c_1$, $c_2$, $c_3$. Each of the XOR gates 70 . . . 73 may be implemented using any appropriate combination of logic elements required to execute the appropriate logical combination of two inputs, as described hereinafter.

For encryption rounds, the values of $c_0 \ldots c_3$ are, respectively, $a_0 \ldots a_3$ as defined above. For decryption rounds, the values of $c_0 \ldots c_3$ are, respectively, $b_0 \ldots b_3$ as defined above. The output of each multiplication circuit 60 . . . 63 is coupled to a first input of a corresponding XOR gate 70 . . . 73. The output of each XOR gate 70 . . . 73 is coupled to a corresponding MixCol register 80 . . . 83. The output of each MixCol register 80 . . . 83 is coupled to the second input of one of the XOR gates 70 . . . 73 according to a feedback plan 90 . . . 93 that corresponds to the row shift function that defines the relationship between successive rows of the matrix. In the present case, the feedback plan 90 . . . 93 implements the right row shift function between successive rows of the matrices $a_{r,c}$ (encryption) and $b_{r,c}$ (decryption)—more generally the matrix $c_{r,c}$.

During operation of the circuit 50, $s_{0c}$, $s_{1c}$, $s_{0c}$, $s_{03}$ are sequentially offered to the multiplication logic 60 . . . 63 on successive cycles by control means 99. At the outset of each column multiplication, the registers $MixCol_0$ to $MixCol_3$ are pre-set to zero.

After the 1$^{st}$ cycle:

$MixCol_0 = c_0.s_{0c}$ $MixCol_1 = c_1.s_{0c}$ $MixCol_2 = c_2.s_{0c}$ $MixCol_3 = c_3.s_{0c}$

After the 2$^{nd}$ cycle:

$MixCol_0 = c_0.s_{1c} \oplus c_1.s_{0c}$ $MixCol_1 = c_1.s_{1c} \oplus c_2.s_{0c}$ $MixCol_2 = c_2.s_{1c} \oplus c_3.s_{0c}$ $MixCol_3 = c_3.s_{1c} \oplus c_0.s_{0c}$ After the 3$^{rd}$ cycle:

$MixCol_0 = c_0.s_{2c} \oplus c_1.s_{1c} \oplus c_2.s_{0c}$ $MixCol_1 = c_1.s_{2c} \oplus c_2.s_{1c} \oplus c_3.s_{0c}$ $MixCol_2 = c_2.s_{2c} \oplus c_3.s_{1c} \oplus c_0.s_{0c}$ $MixCol_3 = c_3.s_{2c} \oplus c_0.s_{1c} \oplus c_1.s_{0c}$ After the 4$^{th}$ cycle:

$MixCol_0 = c_0.s_{3c} \oplus c_1.s_{2c} \oplus c_2.s_{1c} \oplus c_3.s_{0c}$ $MixCol_1 = c_1.s_{3c} \oplus c_2.s_{2c} \oplus c_3.s_{1c} \oplus c_0.s_{0c}$ $MixCol_2 = c_2.s_{3c} \oplus c_3.s_{2c} \oplus c_0.s_{1c} \oplus c_1.s_{0c}$ $MixCol_3 = c_3.s_{3c} \oplus c_0.s_{2c} \oplus c_1.s_{1c} \oplus c_2.s_{0c}$ Rearranging these outputs, according to the feedback plan 90 . . . 93 gives the outputs:

$MixCol_1 = s'_{0,c}$
$MixCol_2 = s'_{1,c}$
$MixCol_3 = s'_{2,c}$
$MixCol_0 = s'_{0,c}$ which is the required result.

It will be noted that, generally speaking, the number of rows, m, in the matrix determines the number of cycles required, while the number of columns, n, determines the number of logic groups (multipliers 60 . . . 63, XOR gates 70 . . . 73, and registers 80 . . . 83) required.

The multiplication logic 60 . . . 63 can be implemented using any suitable logic. In a preferred embodiment, the logic is provided for both encryption and decryption combining certain logic according to the following schedule.

For $c_0 \times s_{0,c}$, there the output from the respective multiplication logic 60 . . . 63 is defined as $e_{cycle,\ bit}$, and d=0 for encryption and d=1 for decryption:

$e_{07} = s_6$ XNOR NAND$(d, s_{45})$ $e_{06} = s_5$ XNOR NAND$(d, s_{347})$ $e_{05} = s_4$ XNOR NAND$(d, s_{236})$ $e_{04} = s_{37}$ XNOR NAND$(d, s_{125})$ $e_{03} = s_{27}$ XNOR NAND$(d, s_{0157})$ $e_{02} = s_{17}$ XNOR NAND$(d, s_{0567})$ $e_{01} = s_0$ XNOR NAND$(d, s_{67})$ $e_{01} = s_7$ XNOR NAND$(d, s_{56})$

Similarly, for $c_1 \times s_{1,c}$:

$e_{17} = s_7$ XNOR NAND$(d, s_4)$ $e_{16} = s_6$ XNOR NAND$(d, s_{37})$ $e_{15} = s_5$ XNOR NAND$(d, s_{267})$ $e_{14} = s_4$ XNOR NAND$(d, s_{1567})$ $e_{13} = s_3$ XNOR NAND$(d, s_{056})$ $e_{12} = s_2$ XNOR NAND$(d, s_{57})$ $e_{11} = s_1$ XNOR NAND$(d, s_6)$ $e_{10} = s_0$ XNOR NAND$(d, s_5)$

Similarly, for $c_2 \times s_{2,c}$:

$e_{27} = s_7$ XNOR NAND$(d, s_{45})$ $e_{26} = s_6$ XNOR NAND$(d, s_{347})$ $e_{25} = s_5$ XNOR NAND$(d, s_{236})$ $e_{24} = s_4$ XNOR NAND$(d, s_{125})$ $e_{23} = s_3$ XNOR NAND$(d, s_{015})$ $e_{22} = s_2$ XNOR NAND$(d, s_{0567})$ $e_{21} = s_1$ XNOR NAND$(d, s_{67})$ $e_{20} = s_0$ XNOR NAND$(d, s_{56})$

Similarly, for $c_3 \times s_{3,c}$:

$e_{37} = s_{67}$ XNOR NAND$(d, s_4)$ $e_{36} = s_{56}$ XNOR NAND$(d, s_{37})$ $e_{35} = s_{45}$ XNOR NAND$(d, s_{267})$ $e_{34} = s_{347}$ XNOR NAND$(d, s_{1567})$ $e_{33} = s_{23}$ XOR $s_7$ XNOR NAND$(d, s_{056})$ $e_{32} = s_{12}$ XOR $s_7$ XNOR NAND$(d, s_{57})$ $e_{31} = s_{01}$ XNOR NAND$(d, s_6)$ $e_{30} = s_{07}$ XNOR NAND$(d, s_5)$ where:

$a_{57} = a_5$ XOR $a_7$ $a_{07} = a_0$ XOR $a_7$ $a_{34} = a_3$ XOR $a_4$ $a_{567} = a_7$ XOR $a_{56}$ $a_{125} = a_{12}$ XOR $a_5$ $a_{1567} = a_{17}$ XOR $a_{56}$ $a_{37} = a_3$ XOR $a_7$ $a_{67} = a_6$ XOR $a_7$ $a_{23} = a_2$ XOR $a_3$ $a_{056} = a_0$ XOR $a_{56}$ $a_{267} = a_2$ XOR $a_{67}$ $a_{27} = a_2$ XOR $a_7$ $a_{56} = a_5$ XOR $a_6$ $a_{12} = a_1$ XOR $a_2$ $a_{347} = a_{34}$ XOR $a_7$ $a_{0157} = a_{01}$ XOR $a_{57}$ $a_{17} = a_1$ XOR $a_7$ $a_{45} = a_4$ XOR $a_5$ $a_{01} = a_0$ XOR $a_1$ $a_{236} = a_{23}$ XOR $a_6$ $a_{0567} = a_{07}$ XOR $a_{56}$

This requires 23 XOR gates, 32 XNOR gates and 32 NAND gates.

Other embodiments are intentionally within the scope of the accompanying claims.

The invention claimed is:

1. A logic circuit for encrypting and decrypting data including shifting in a MixColumn transform by multiplication of an (m×n) matrix of data by a (1×n) or by a (m×1) matrix, where m is a number of rows and n is a number of columns, and wherein each successive row m of n elements is a predetermined row permutation of a preceding row, the circuit comprising:

n multiplication circuits for performing a multiplication function on a value of data, each n multiplication circuit having data input for receiving input data and an output for outputting a changed value of the data received by said input, the output value of the data comprising the input data that has been multiplied by a predetermined multiplicand;

n logic circuits, each logic circuit comprising at least a first input and a second input for executing a predetermined logical combination of the first input and the second input to provide a logical output, the first input being coupled to the output of a corresponding one of the n multiplication circuits;

n registers coupled to said n logic circuits for receiving and storing said logical output from a respective logic circuit;

feedback logic for routing stored contents of each register to a selected one of the second inputs of said n logic circuits in accordance with a feedback plan that corresponds to a predetermined row permutation; and control means for successively providing a data input to each of the n multiplication circuits for each element in the (1×n) or (m×1) matrix; and wherein said n registers in accordance with said feedback logic having a data-shifted output of the data input by the control means, the data-shifted output in each of the n registers having a state "s" for remaining encryption or decryption operations.

2. The logic circuit of claim 1 in which the feedback logic provides a feedback plan corresponding to said predetermined row permutation that is a row shift.

3. The logic circuit of claim 2 in which the row shift is a single element right shift.

4. The logic circuit of claim 1 in which the n logic circuits are each adapted to execute an XOR-combination of said first input and said second input.

5. The logic circuit of claim 1 in which each of the predetermined multiplicands corresponds to one of the elements in the AES Rijndael MixColumns transform function.

6. The logic circuit of claim 5 in which the number m=4, the number n=4, the multiplicand for the first multiplication circuit=02, the multiplicand for the second multiplication circuit=03, the multiplicand for the third multiplication circuit=01, and the multiplicand for the fourth multiplication circuit=01.

7. The logic circuit of claim 5 in which the number m=4, the number n=4, the multiplicand for the first multiplication circuit=0E, the multiplicand for the second multiplication circuir=0B, the multiplicand for the third multiplication circuit=0D, and the multiplicand for the fourth multiplication circuit=09.

8. The logic circuit of claim 6, in which the four multiplicands are switched between the values in claim 6.

9. The logic circuit of claim 1 in which the control means is adapted to successively provide as input to each of the n multiplication circuits each successive element in the (1.times.n) or (m.times.1) matrix over each of n or m cycles of operation respectively.

10. The logic circuit of claim 1 in which each of the n multiplication circuits, each of the n logic circuits, and each of the n registers are at least eight bits wide.

11. The logic circuit of claim 1 in which the control means further includes means for providing as output from said logic circuit the contents of the n registers after each nth cycle.

12. The logic circuit of claim 1 in which the control means further includes means for resetting each of the registers prior to the first calculation cycle.

13. The logic circuit of claim 1 in which each successive row m of n elements is a predetermined row permutation of the immediately preceding row.

14. An AES MixColumns transform circuit incorporating the logic circuit of claim 1.

15. A smartcard comprising the logic circuit according to claim 1.

16. An AES encryption and/or decryption engine incorporating the logic circuit for performing the MixColumns transform, said logic circuit for multiplication of a matrix by a or by a matrix, where m is a number of rows and n is a number of columns, and wherein each successive row m of n elements is a predetermined row permutation of a preceding row, the circuit comprising:

n multiplication circuits each having an input and an output which returns the value of said input multiplied by a predetermined multiplicand;

n logic circuits, each for executing a predetermined logical combination of a first input and a second input to provide a logical output, the first input being coupled to the output of a corresponding one of the n multiplication circuits: n registers for receiving said logical output;

feedback logic for routing the contents of each register to a selected one of the second inputs in accordance with a feedback plan that corresponds to the predetermined row permutation; and control means for successively providing as input to each of the n multiplication circuits each element in the or matrix.

17. A method for encrypting and decrypting data including shifting in a MixColumn transform by multiplication of an (m×n) matrix of data by a (1×n) or by a (m×1) matrix, where m is a number of rows and n is a number of columns, and wherein each successive row m of n elements is a predetermined row permutation of a preceding row, comprising the steps of:

successively providing an input to each of n multiplication circuits for each element in the (1×n) or (m×1) matrix by a control means;

performing a multiplication function by "n" multiplication circuits on a value of data, each n multiplication circuit having a data input for receiving data and an output for outputting a changed value of the data received by said input, the changed value of the data comprising input data that has been multiplied by a predetermined multiplicand;

executing a predetermined logical combination by n logic circuits to provide a logical output, each logic circuit comprising at least a first input and a second input, the first input being coupled to an output of a corresponding one of the n multiplication circuits;

receiving and storing said logical output from a respective logic circuit of n logic circuits by a register from a plurality of n registers, n registers being coupled to said n logic circuits;

routing the contents of each register to a selected one of the second inputs of said n logic circuits by feedback logic in accordance with a feedback plan that corresponds to a predetermined row permutation; and storing a data-shifted output of the data input by the control means, the data-shifted output in each of the n registers received by the n registers in accordance with the feedback logic, and the data-shifted output having a state "s" for use in remaining encryption or decryption operations.

* * * * *